W. N. BLACK.
PORTABLE HAND TRUCK.
APPLICATION FILED DEC. 29, 1913.
1,131,656. Patented Mar. 16, 1915.
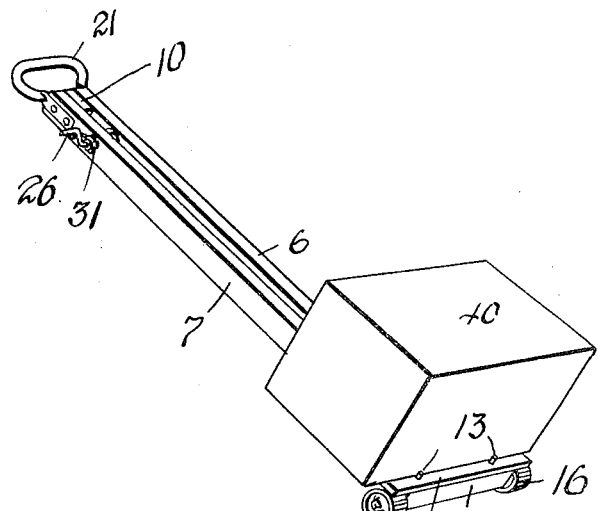
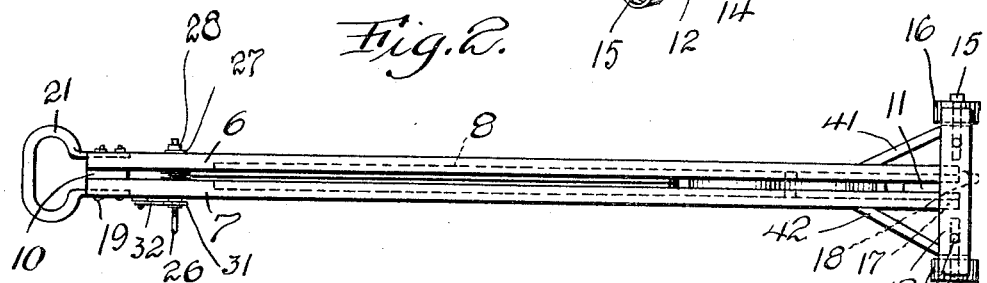
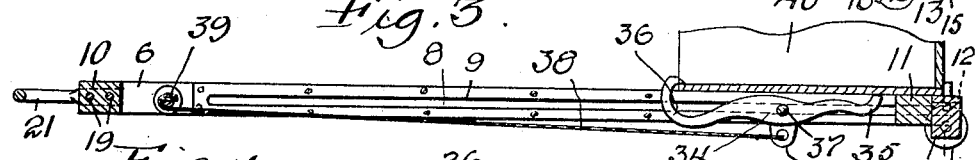
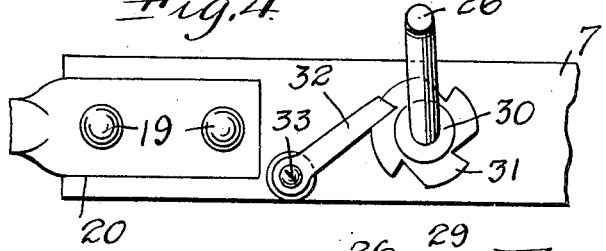
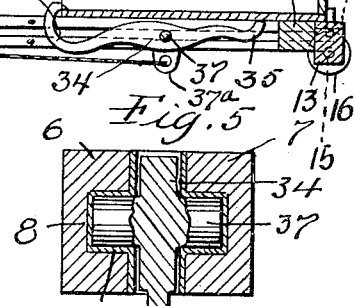
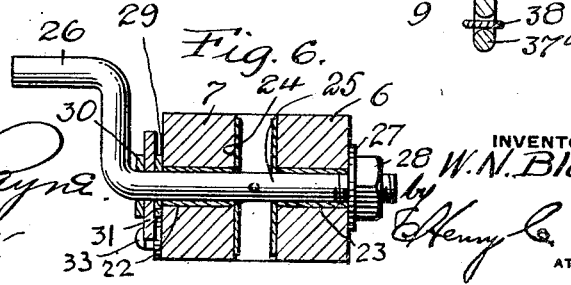
WITNESSES
INVENTOR
W. N. Black
ATTORNEYS
THE NORRIS PETERS CO., PHOTO-LITHO., WASHINGTON, D. C.

UNITED STATES PATENT OFFICE.

WILLIAM N. BLACK, OF WILKINSBURG, PENNSYLVANIA.

PORTABLE HAND-TRUCK.

1,131,656.  Specification of Letters Patent.  Patented Mar. 16, 1915.

Application filed December 29, 1913. Serial No. 809,296.

*To all whom it may concern:*

Be it known that I, WILLIAM N. BLACK, a citizen of the United States of America, residing at Wilkinsburg, in the county of Allegheny and State of Pennsylvania, have invented certain new and useful Improvements in Portable Hand-Trucks, of which the following is a specification, reference being had therein to the accompanying drawing.

This invention relates to portable hand trucks, and has for its object to provide a truck of such class, in a manner as hereinafter set forth, which is particularly adapted for transporting from point to point wooden packing cases particularly empty cases with the cover removed.

Although the truck is designed primarily for transporting empty packing cases, yet it is to be understood that the truck can be used for any purposes wherein it is found applicable.

A further object of the invention is to provide a portable hand truck with means, in a manner as hereinafter set forth, to constitute an adjustable gripping element capable of engaging with packing cases of various sizes for connecting the case to the truck when transporting the case thereby preventing the latter from slipping off the truck.

Further objects of the invention are to provide a portable hand truck which is simple in its construction and arrangement, strong, durable, efficient and convenient in its use, readily set up and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings, wherein like reference characters denote corresponding parts thoughout the several views, Figure 1 is a perspective view of a portable hand truck in accordance with this invention showing the packing case mounted thereon, Fig. 2 is a plan view of the truck, Fig. 3 is a longitudinal sectional view illustrating the gripping element connecting a packing case to the body portion of the truck, Fig. 4 is a cross sectional view and further illustrating the gripping member partly in section, and Fig. 5 is a cross sectional view illustrating the shaft for shifting the pulling means for the gripping element. Fig. 6 is a cross sectional view of the handle actuating element for the gripping member.

Referring to the drawings in detail, the body portion of the truck is formed of a pair of longitudinally extending bars 6 and 7, preferably constructed of wood, but any suitable material may be employed, and each of said bars 6 and 7 has its inner face provided with a longitudinally extending groove 8, which is of a length to extend from the lower end of its respective bar to a point removed from the upper end thereof. The grooves 8 of said bars oppose each other and secured to the inner face of each bar, as well as extending into and of the same contour as a groove 8 is a thin metallic reinforcing member 9. That portion of the member 9 which extends in a groove 8 provides a guide groove for a purpose to be presently referred to.

Secured between the upper ends of the bars 6 and 7 is a spacing block 10 and secured between the lower ends of said bars 6 and 7 is a spacing block 11. The bars 6 and 7 are arranged in close proximity to each other.

Mounted against the block 11 as well as being flush with the upper face thereof is a transversely extending oblong support 12 provided with a pair of upright stops 13, and secured to the lower face of said support 12 is an axle 14 having headed spindles 15 projecting therefrom and upon which are mounted rollers or wheels 16. The member 12 projects over the rollers 16 but is out of contact therewith.

The bars 6 and 7 have their upper face flush with the upper face of the block 11, and having their lower ends provided with tenons 17, which extend into sockets in the axle 14 and holdfast devices 18 are employed for fixedly securing the tenons 17 to the axle 14.

The upper end of the bars 6 and 7 have secured to the outer faces thereof, by holdfast devices 19 bolts 20, which have a handle 21 formed integral therewith.

Mounted in each of the bars 6 and 7 between the upper ends of the grooves 8 and the plates 20 are a pair of transversely extending bearing sleeves 22 and 23, which are oppositely disposed with respect to each other and each of which has its inner end provided with an annular flange 24. The flanges 24 are fixed to the bars 6 and 7 and abut against the inner faces of said bars.

Extending through the sleeves 22 and 23 and projecting from each of the bars 6 and 7 is a shaft 25 having one end provided with a handle 26 and its other end with a washer 27 and a nut 28. The handle 26 in connection with the nut 28 prevents transverse shifting of the shaft 25, but the latter can turn in the sleeves 22, 23. The washer 27 abuts against the outer face of the bar 6, and a washer 29 is mounted upon the shaft 25 and abuts against the outer face of the bar 7.

Mounted upon the shaft 25 and opposing the washer 29 is a washer 30 and fixed to said shaft 25 between said washer 29 and 30 is a ratchet wheel 31 adapted to be engaged by a pawl 32, which is pivoted as at 33 to the bar 7. When the pawl 32 is in engagement with the ratchet 31, rotatable movement of the shaft 25 in one direction is arrested. Shiftable in a direction with respect to the bars 6 and 7 is an adjustable gripping member 34 provided at its lower end with a nose 35 and at its other end with a hook 36. The member has a pair of oppositely disposed trunnions 37 which are mounted in the guide grooves formed by the members 9. The trunnions 37 can rock as well as slide in the guide grooves and projecting from said gripping member 34 is an apertured lug 37 having attached thereto one end of a flexible member 38, while the other end of said member 38 is fixed, as at 39 to the shaft 25. The flexible member 38 is wound upon shaft 25 by rotating handle 26 so that the gripping member 34 may be longitudinally adjusted, to accommodate different sizes of boxing.

In Fig. 3 of the drawings, an empty packing case as indicated by the reference character 40 is mounted upon the truck and the hook 36 extends into said case whereby the latter is connected to the truck. When a packing case is mounted upon the truck, it is tilted outwardly so that one edge of the case engages the upright stops 13 and the other end the nose 35 of the gripping member 34, the gripping member will be rocked on its pivot so that the hook 36 will be thrown upwardly to overlap the edge of a wall of the case 40, and the weight of the case, in connection with the stops 13, will maintain the hook 36 in engagement with the case whereby the latter will be coupled to the truck, the said gripping member 34 meanwhile has been adjusted to the size of the case or box to be handled.

It will be assumed that a packing case has been positioned upon the truck against the stops 13, and if the packing case projects beyond the hook 36, under such conditions to couple the gripping member to connect the case to the truck, the shaft 25 is revolved to wind the flexible member 38 thereon, such action will shift the gripping member 34 toward the shaft and the shifting of the member is continued until the hook thereof extends over the free edge of the gripping case. When the hook 36 has been shifted to the position stated, the pawl 32 is then employed to arrest back rotation of the shaft 25. When the case has been transported to the point desired, the shaft 25 is rotated to move the gripping member free of the case whereby the latter can be removed from the truck. Brace members 41 and 42 are connected to the bars 6 and 7 and to the axle 14.

What I claim is:—

1. A hand truck comprising a portable body portion provided with stops at the lower part thereof, a longitudinally shiftable gripping member pivotally mounted in said body portion and capable of engaging the packing case for connecting it to said body portion a shaft rotatably mounted in said body portion, a flexible member secured to said shaft for shifting said gripping member longitudinally of the body portion and a drum carried by the shaft and body portion for winding said flexible member to shift the gripping member.

2. A hand truck comprising a portable body including a pair of spaced bars having grooves in their inner faces, a longitudinally shiftable gripping member provided with trunnions pivotally and slidably mounted in said grooves and capable of engaging a packing case for connecting it to said body, a shaft rotatably mounted in the upper end of said body portion, and a flexible member adapted to be wound on said shaft and connected to said gripping member for longitudinally shifting it.

In testimony whereof I affix my signature in the presence of two witnesses.

WILLIAM N. BLACK.

Witnesses:
CHARLES F. EICHARDT,
NICHOLAS L. BOGAN.